UNITED STATES PATENT OFFICE

EMIL REUBKE, OF BITTERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

METHOD OF IMPROVING THE PROPERTIES OF PORTLAND CEMENTS

No Drawing. Application filed September 11, 1928, Serial No. 305,329, and in Germany October 17, 1927.

It is well known to improve the strength of Portland-cements by adding small quantities of various chemicals; for example by adding chloride of calcium the hardening process is accelerated without detrimentally affecting the strength finally attained. The use of chloride of calcium however is disadvantageous because of its hygroscopic properties, the cement becoming clumpy and moist when stored in places not rigorously kept dry. For the same reason it is practically impossible to obtain a homogeneous mixture of the cement with chloride of calcium save by the application of special technical means of treatment.

I have now discovered that an addition of a relatively small amount of sulphide of calcium produces a very considerable improvement in the qualities of Portland-cement. The preliminary hardening of the cement is accelerated whilst, at the same time, the final hardness runs up to much higher figures than are otherwise obtained. The time required for setting is not influenced by this addition, therefore there is no danger of premature setting.

The invention is carried into effect simply by mixing with the cement the amount of sulphide of calcium required to produce the desired effect.

The following figures give the rise of resistance to compressive strain of a Portland-cement of average marketable quality by the addition of 1 and 5 percent respectively of sulphide of calcium. (Test samples consisting of one part of cement and three parts of sand.)

| Resistance in kg/cm² attained after | 3 days | 7 days | $28w^{+)}$ days | $28cs^{+)}$ days |
|---|---|---|---|---|
| Portland-cement without CaS | 244 | 345 | 407 | 420 |
| Portland-cement with 1 percent CaS | 335 | 407 | 497 | 567 |
| Portland-cement with 5 percent CaS | 349 | 416 | 503 | 603 |

As will be noticed the addition of 1 percent of sulphide of calcium is sufficient to produce an excellent high-grade cement from ordinary good cement.

When the raw materials are specially well prepared as is done in producing quick hardening cements the preliminary strength as obtained by the addition of sulphide of calcium is such as could be hitherto obtained only with alumina-cements which are particularly called for because of their rapid preliminary hardening. The following example gives the figures obtained as regards resistance to compressive strain and tensile strength in kg/cm².

| Resistance attained after | 3 days | 7 days | $28w^{+)}$ days | $28cs^{+)}$ days |
|---|---|---|---|---|
| Portland-cement without CaS | 351 | 447 | 559 | 613 |
| Portland-cement with 1 percent CaS | 415 | 523 | 624 | 743 |
| Portland-cement with 3 percent CaS | 479 | 525 | 646 | 745 |

| Tensile strength after | 3 days | 7 days | $28w^{+)}$ days | $28cs^{+)}$ days |
|---|---|---|---|---|
| Portland-cement without CaS | 26,5 | 31,7 | 31,9 | 45,4 |
| Portland-cement with 1 percent CaS | 29,4 | 33,4 | 32,8 | 42,2 |
| Portland-cement with 3 percent CaS | 33,0 | 34,8 | 35,8 | 45,4 |

$+)w$=stored in water.
$cs$=stored in water for 7 days and in the air of the laboratory during the remaining time (combined storage).

The rates of setting of the cements treated were—

| | Hours |
|---|---|
| No addition | 2¼ |
| Added 1 percent CaS | 3 |
| Added 3 percent CaS | 2½ |

The results prove that the addition of sulphide of calcium produces a surplus hardening effect hitherto unattained by any other means.

I claim:

1. The method of improving the properties of Portland-cements consisting in admixing thereto a quantity of sulphide of calcium producing both additional resistance to compressive strain and additional tensile strength.

2. The method of improving the properties of Portland-cements consisting in admixing thereto up to 5 per cent of sulphide of calcium.

3. The method of improving the properties of Portland-cements consisting in admixing thereto approximately 3 percent of sulphide of calcium.

4. As a new product a Portland-cement containing a quantity of sulphide of calcium producing both additional resistance to compressive strain and additional tensile strength.

5. As a new product a Portland-cement containing up to 5 percent of sulphide of calcium.

6. As a new product a Portland-cement containing approximately 3 percent of sulphide of calcium.

In testimony whereof, I affix my signature.

EMIL REUBKE.